May 6, 1969  L. A. MEDLAR  3,443,191
BATTERY CHARGER WITH LOW CURRENT CUTOFF
Filed Sept. 15, 1966

INVENTOR.
LEWIS A. MEDLAR
BY
Arnold & Roylance
ATTORNEYS

United States Patent Office 3,443,191
Patented May 6, 1969

---

3,443,191
BATTERY CHARGER WITH LOW CURRENT
CUTOFF
Lewis A. Medlar, Lansdale, Pa., assignor to Fox
Products Company, Philadelphia, Pa., a corporation of Pennsylvania
Filed Sept. 15, 1966, Ser. No. 579,774
Int. Cl. H02j 7/10
U.S. Cl. 320—24   4 Claims This invention relates to an apparatus for providing controlled voltage and current for charging a rechargeable battery, and more specifically to a solid state battery charging apparatus for providing power to a battery and for fully terminating charging current when the battery has been charged.

In most circumstances where battery chargers are used, it is necessary to control the charging current supplied to the battery and to respond to terminal voltage or other indicia of a fully charged battery to decrease charging current to a safe level. These steps are necessary to prevent overheating of the battery and to avoid other conditions detrimental to the battery structure. In most such cases a continuing trickle of current following the main charging cycle is of no particular importance because the charger will be disconnected from the battery terminals after a relatively short period of time in the normal course of events.

In those circumstances where it has been considered desirable to fully terminate current flow to the battery, the usual approach has been to provide some mechanical or electro-mechanical disconnecting device actuated, for example, by a timing apparatus.

Recently, manufacturers of various types of electrical or electronic devices have made available to consumers articles which contain batteries of the rechargeable "wet" type, e.g., lead-acid batteries, these batteries being incorporated in the articles with the intention that they remain therein over an extended period of time. One example is a portable television receiver, from which the battery is not to be removed until it becomes basically defective and must be replaced. Obviously, it is necessary also to provide a charger in the receiver, one which will recharge the battery whenever the receiver is connected to a source of power such as conventional AC house current. A charging circuit of this type is the subject of the present invention.

One problem which arises in the circumstances outlined above, in addition to the need for a controlled current-voltage profile for battery charging, is that the charging circuit should not be allowed to supply current to the battery after a fully charged state is reached. This "leakage" current, at a relatively constant low level, tends to cause undesirable battery overcharge, which leads to grid corrosion and shortens battery life. Yet the use of mechanical or electromechanical switching means is also undesirable because of the size, weight and expense of such means of a type which will perform the task adequately and reliably.

It is therefore an object of the present invention to provide battery charging apparatus which has a controlled charging current profile and which is usable in portable electrical appliances.

Another object is to provide battery charging apparatus which has a preselected charging current profile and which automatically terminates charging current flow at a preselected low current level.

A still further object is to provide battery charging apparatus having means for terminating charging current flow at a preselected low current level, which means includes no moving parts.

Briefly described, a preferred embodiment of the apparatus incorporating this invention includes means connectable to a source of alternating current, rectifying means and a controlled conductivity power transistor connected in series between the source and the battery to be charged. The power transistor is controlled by a voltage divider in parallel with the battery, and a transistor circuit coupled to the voltage divider, the transistor circuit being responsive to a voltage level at the divider to control conductivity of the power transistor. A Zener diode is connected in the divider circuit to provide a reference level.

The above circuit provides the desired charging current profile. The low current cutoff operation is provided by another voltage divider, this divider being connected in parallel with the source, a transistor connected to that divider, and a diode-capacitor circuit connecting the last-mentioned transistor to the previously described control transistor circuit. At low current levels this circuit acts to charge the capacitor and to cause the control circuit to place the power transistor in a conductive state. Battery charging current is therefore terminated.

In order that the manner in which the foregoing and other objects are attained in accordance with the invention can be understood in detail, a particularly advantageous embodiment thereof will be described with reference to the accompanying drawings which form a part of this specification and wherein.

Figure 1:
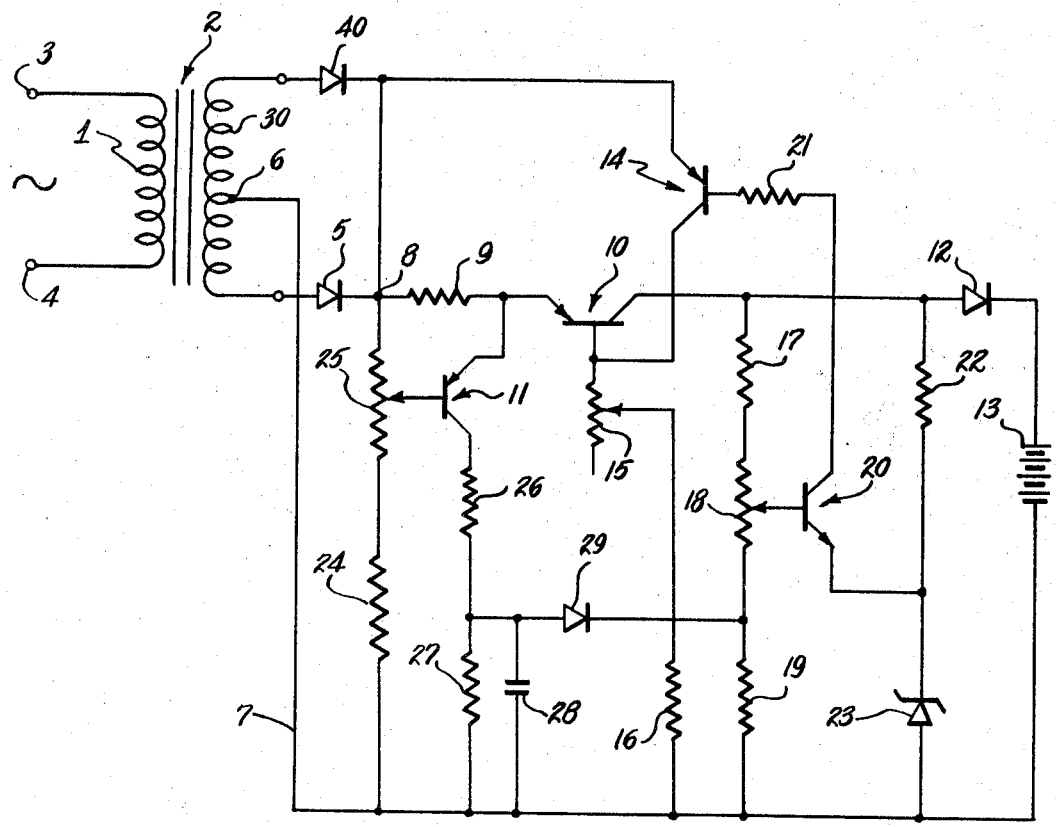
FIG. 1 is a schematic diagram showing one embodiment of the invention.

In FIG. 1 a primary winding 1 of an input transformer, generally indicated at 2, is connected to power input terminals 3 and 4. In a complete apparatus, terminals 3 and 4 would normally be connected to a power line connectable to a conventional source of alternating current. Transformer 2 also has a center tapped secondary winding 30, one end terminal of which is connected to the anode of a semiconductor diode 40. The other end terminal of winding 30 is connected to the anode of a semiconductor diode 5. Center terminal 6 of winding 3 is connected to a common conductor 7 of the remaining circuitry. The cathodes of diodes 40 and 5 are connected to a junction point 8 at which a full wave rectified pulsating DC current appears when alternating current is applied to terminals 3 and 4.

One terminal of a resistor 9 is connected to junction 8, the other end of resistor 9 being connected to the emitter electrode of a PNP transistor indicated generally at 10 and also to the emitter electrode of a PNP transistor indicated generally at 11. The collector electrode of transistor 10 is connected to the anode of a semiconductor diode 12, the cathode of which is connected to the positive terminal of a rechargeable storage battery indicated generally at 13 which is to be charged by this circuit. The negative terminal of battery 13 is connected to common conductor 7.

The base electrode of transistor 10 is connected to the collector electrode of a PNP transistor indicated generally at 14. The emitter electrode of transistor 14 is connected to junction 8. The base of transistor 10 is also connected to one terminal of a variable resistance 15, the movable wiper of which is connected to one terminal of a fixed resistor 16, the other terminal of which is connected to a common conductor 7.

A voltage divider circuit comprising fixed resistors 17 and 19 and variable tapped resistor 18 is connected between the collector electrode of transistor 10 and common conductor 7, this voltage divider being essentially in parallel with battery 13. Resistor 18 is connected as a potentiometer, the end terminals of which are connected in the voltage divider circuit and the movable wiper of which is connected to the base electrode of an NPN transistor indicated generally at 20. The collector electrode of transistor 20 is connected to one terminal of a fixed resistor 21, the other terminal of which is connected to the base electrode of transistor 14.

The emitter electrode of transistor 20 is connected to one terminal of a fixed resistor 22, the other terminal of which is connected to the anode of diode 12, and to the cathode of a Zener diode 23, the anode of which is connected to lead 7. As will be recognized by one skilled in the art, resistor 22 and Zener diode 23 form another voltage divider connected essentially in parallel circuit relationship with battery 13.

A fixed resistor 24 and a potentiometer 25 are connected in series circuit relationship to form a voltage divider between junction 8 and conductor 7, essentially in parallel with the charging current source. The movable wiper of potentiometer 25 is connected to the base electrode of transistor 11. The collector electrode of transistor 11 is connected to one terminal of a fixed resistor 26, the other terminal of which is connected to one terminal of a fixed resistor 27, one plate of a capacitor 28 and the anode of a semiconductor diode 29. The other terminal of resistor 27 and the other plate of capacitor 28 are connected to conductor 7. The cathode of diode 29 is connected to the junction of resistors 18 and 19.

The operation of the circuit commences with the connection of terminals 3 and 4 to an AC supply causing a DC voltage to appear at terminal 8, thereby causing a current flow through the emitter-base circuit of a transistor 10 sufficient to place that transistor in a conductive state and to allow charging current to flow through the emitter-collector circuit of transistor 10, through diode 12 and to battery 13.

Figure 2:
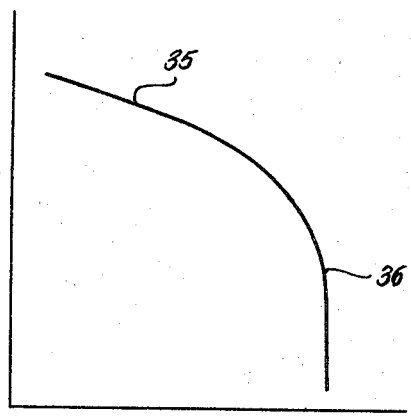
FIG. 2 is a graph showing a charging current curve as produced by an apparatus of the type of FIG. 1.

At this point, it will be helpful to refer to FIG. 2 which shows a graph of the relationship of battery charging current to battery terminal voltage during the charging process. It will be assumed that the battery terminal voltage is initially low enough to place the initial operating point on the gradually downwardly sloping portion 35 of the curve. At that point, the charging current, as will be seen from FIG. 2, is relatively high.

The voltage divider including resistor 22 and Zener diode 23 establishes a reference voltage level at the emitter of transistor 20. The voltage across a portion of the voltage divider including resistors 17 and 19 and potentiometer 18 is compared with that reference level by the base-emitter circuit of transistor 20. The values of resistors 17 and 19 and potentiometer 18, and the setting of potentiometer 18, are selected so that, below a preselected level of battery terminal voltage, the base electrode of transistor 20 is more negative than the emitter electrode. Transistor 20 is therefore nonconductive and the lack of current flow through the emitter-collector circuit of transistor 20 keeps transistor 14 similarly in a nonconductive state.

As the battery terminal voltage rises and reaches a preselected level, which is adjustable by movement of the wiper of potentiometer 18, the base of transistor 20 becomes more positive than the emitter and current flows through the base-emitter circuit of that transistor. Likewise, current flow through the emitter-collector circuit of transistor 20 allows transistor 14 also to conduct current. Resistor 9, which is a relatively low value resistor, causes a small voltage drop which maintains the emitter of transistor 11 negative with respect to its base to keep transistor 11 cut off.

As the battery terminal voltage continues to rise, i.e., as the operating point moves to the right along the graph shown in FIG. 2, the base of transistor 20 responds to the increasing voltage as divided across its voltage divider by becoming more positive, increasing current flow through transistor 20 and, in turn, through transistor 14. As the conductivity of transistor 14 increases, the current flow through resistors 15 and 16 likewise increases, thereby increasing the voltage drop across those resistors and raising the voltage level at the base of transistor 10. As this voltage continues to rise, and as the emitter voltage remains substantially constant, the conductivity of transistor 10 begins to decrease. This is reflected in FIG. 2 by the gradually diminishing magnitude of the battery charging current with increasing battery terminal voltage, significant conduction of transistors 14 and 20 occurring at the knee region of the curve.

As this process continues, transistors 20 and 14 become highly conductive and transistor 10 is at a very low conductive level due to the high current flow through resistors 15 and 16, and the circuit is then responsive only to battery terminal voltage, the operating point then being on the steep portion of the current-voltage curve of FIG. 2, this portion being indicated at 36.

However, complete charging-current cutoff is never reached with the circuit thus far described. The battery voltage increases and the charging current decreases until a point of equilibrium is reached near the lower end of curve portion 36 in FIG. 2. To completely cut off this charging current flow, the circuit incorporating transistor 11 and its associated circuit elements is employed. When full charging current is flowing, the voltage drop across resistor 9 causes the emitter electrode of transistor 11 to be more negative than its base electrode, the potential of the base electrode having been established by the voltage divider including resistor 24 and potentiometer 25, this level being adjusted by adjustment of potentiometer 25. With the base electrode of transistor 11 more positive than the emitter electrode, transistor 11 is in a nonconductive state. As the charging current flow decreases, the emitter electrode of transistor 11 becomes more positive until at a preselected value of charging current, the emitter electrode becomes more positive than the level established at the base electrode. Current then flows in the emitter-collector circuit of transistor 11 and develops a voltage in resistors 26 and 27.

The wave form relationships between the voltages at the junction of resistors 26 and 27 and at the cathode end of diode 29, as developed across resistor 19, are somewhat complex and need not be described in detail herein. It will be sufficient to note that, as transistor 11 becomes conductive, a charging circuit is established for capacitor 28, the charge being retained on capacitor 28 by the relatively high resistance of resistor 27.

When the charging current decreases to a point such that the conductivity of transistor 11 allows a greater voltage to exist across capacitor 28 than exists across resistor 19, diode 29 is then forward biased and current flows through that diode to the circuit including the emitter-collector circuit of transistor 11, resistor 26, diode 29 and resistor 19. This increased current flow to resistor 19 increases the voltage drop across resistor 19 and thereby raises the potential at the base electrode of transistor 20. The increase in the base potential of transistor 20 drives that transistor further into conduction, thereby also driving transistor 14 into a state of higher conductivity and decreasing the conductivity of transistor 10 through the process discussed previously. As the current flow through transistor 10 further decreases, the conductivity of transistor 11 further increases, again raising the base potential of transistor 20. This closed loop regenerative feedback continues until transistor 10 is completely nonconductive and no further charging current flows to the battery. The circuit will then remain in this state until power is removed from the system for a time sufficient to allow capacitor 28 to discharge. If the system is then again connected to a source of alternating current, the previously described processes will be repeated, commencing at a point on the curve of FIG. 2 which is consistent with the terminal voltage of battery 13 at the time of re-connection.

While one advantageous embodiment has been chosen to illustrate the invention, it will be understood by those skilled in the art that there are changes and modifica-

What is claimed is:

1. An apparatus for providing a controlled charging current to a battery comprising the combination of:
   input circuit means connectable to a source of alternating current;
   rectifier circuit means connected to said input circuit means and having a DC output terminal for providing rectified current at said output terminal;
   a battery to be charged;
   a first transistor having base, emitter and collector electrodes,
       the emitter-collector circuit of said first transistor being connected in series circuit relationship between said DC output terminal and said battery;
   a first voltage divider circuit connected in parallel circuit relationship with said battery;
   a second voltage divider circuit connected in parallel circuit relationship with said battery;
   a second transistor having base, emitter, and collector electrodes,
       the base-emitter circuit of said second transistor being connected between an intermediate point on said first voltage divider circuit and an intermediate point on said second voltage divider circuit;
   first circuit means interconnecting said collector electrode of said second transistor and said base electrode of said first transistor,
       said second transistor and said first circuit means being responsive to increasing battery terminal voltage as divided by said first and second voltage divider circuits to control the conductivity of said first transistor and to diminish charging current to said battery to a preselected low level;
   a third transistor having base, emitter and collector electrodes; and
   second circuit means including said third transistor connected between said DC output terminal and said second voltage divider,
       said second circuit means being responsive to charging current flow at said preselected low level to render said first transistor nonconductive.

2. An apparatus in accordance with claim 1 wherein said second circuit means comprises:
   a resistor connected to said DC source terminal in series circuit relationship with said first transistor;
   a third voltage divided circuit connected in parallel circuit relationship with said source,
       the base-emitter circuit of said third transistor being connected between an intermediate point on said third voltage divider and said resistor,
       said resistor and said third voltage divider circuit being operative to render said third transistor conductive when the charging current decreases to said preselected low level;
   resistance circuit means connected between the collector of said third transistor and a point of reference potential;
   asymmetrically conductive circuit means connected between said resistance circuit means and an intermediate point on said second voltage divider; and
   a capacitor connected between said asymmetrically conductive circuit means and a point of reference potential,
       said resistance circuit means being a charging circuit for said capacitor when said third transistor is conductive,
       the charge on said capacitor being operative to render said second transistor fully conductive and said first transistor nonconductive.

3. An apparatus in accordance with claim 1 wherein said first circuit means comprises:
   a fourth transistor having base, emitter and collector electrodes,
       the collector electrode of said fourth transistor being connected to said base electrode of said first transistor; and
   a resistance circuit means interconnecting said base electrode of said fourth transistor and said collector electrode of said second transistor.

4. An apparatus for providing charging current to a battery, the apparatus being of the type having a source of charging current, a series power transistor connected between the source and the battery for carrying and controlling the magnitude of the charging current, and first transistor circuit means responsive to battery terminal voltage to control the conductivity of the series transistor, wherein the improvement comprises the combination of:
   a resistor connected in series circuit relationship with the series transistor;
   second transistor circuit means connected to said resistor for sensing a low current flow through said resistor;
   a diode connected between said second transistor circuit means and said first transistor circuit means; and
   a capacitor connected to said second transistor circuit means and said diode,
       said second transistor circuit means being responsive to said low current flow to pass current to charge said capacitor,
   said diode being responsive to a predetermined level of charge on said capacitor to pass current to said first transistor circuit means to render said series transistor fully nonconductive.

References Cited

UNITED STATES PATENTS 3,392,317   7/1968   Eberts et al. _____ 320—40 X

JOHN F. COUCH, *Primary Examiner.*

STANLEY WEINBERG, *Assistant Examiner.*

U.S. Cl. X.R.

320—40; 323—4